March 19, 1957  J. T. NICHOLSON  2,785,501
COMBINATION JAW OPENER AND FISHHOOK REMOVER
Filed Sept. 26, 1955  2 Sheets-Sheet 1

INVENTOR
J. T. NICHOLSON

BY Herbert J. Jacobi

ATTORNEY

March 19, 1957    J. T. NICHOLSON    2,785,501
COMBINATION JAW OPENER AND FISHHOOK REMOVER
Filed Sept. 26, 1955    2 Sheets-Sheet 2

INVENTOR
J. T. NICHOLSON

BY Herbert J. Jacobi
ATTORNEY

United States Patent Office 2,785,501
Patented Mar. 19, 1957

2,785,501

COMBINATION JAW OPENER AND FISHHOOK REMOVER

Joseph Theodore Nicholson, Juneau, Territory of Alaska

Application September 26, 1955, Serial No. 536,703

3 Claims. (Cl. 43—53.5)

This invention relates to means for extracting fishhooks from the mouths of fish and is particularly concerned with means for spreading the jaws of the fish and retaining them in spread relation while an associated probe is operated to engage the hook and dislodge it from its impalement of the fish jaw.

Both fish jaw spreaders and fishhook disgorgers have heretofore been provided. However, the spreaders have not included means for engaging an impaled hook nor have the disgorgers included means for spreading the jaws to facilitate the disgorging operation. Pivoted spreaders have been suggested, by which the jaws of a fish might be held in an open condition while a hook might be manually extracted or while some type of disgorging instrument was applied. Disgorging or extracting tools have also been suggested for use in conjunction with the manual spreading of the fish jaws or for use with a separate spreading device. Obviously, in either case, much manual dexterity and/or the use of a plurality of instruments was required. If either the spreading or the extracting was done by hand, the process was unpleasant and time consuming, even to those quite skilled and experienced. If multiple instruments were used not only was there problems arising from the simultaneous manipulation of such plural devices, but such devices increased the number of elements of the total fishing tackle, as well as increased the cost of such tackle.

It is therefore, among the primary objects of the present invention to provide a combined device for simultaneously spreading the jaws of a fish and for extracting or disgorging an impaled hook therefrom while the device retains the jaws in spread relation.

Another object of the invention is to provide a novel and improved fish jaw spreader means by which the simple pivotal movement of inter-connected arms will act to impale and secure the jaws spreading them apart and firmly securing them in spread position.

A further object of the invention is to provide novel and improved extracting or disgorging means readily applicable to an impaled hook within the fish mouth and regardless of the various locations therein, at which the hook may be attached.

It is also among the objects of the invention to provide a device of the character set forth with actuating or manipulating grips readily operable by a single hand, thus leaving the other hand free to hold the fish or to manage lines and like other paraphernalia.

These and numerous other objects, features and advantages of the present invention will be apparent from a consideration of the following specification taken in conjunction with the accompanying drawing in which.

Figure 1:
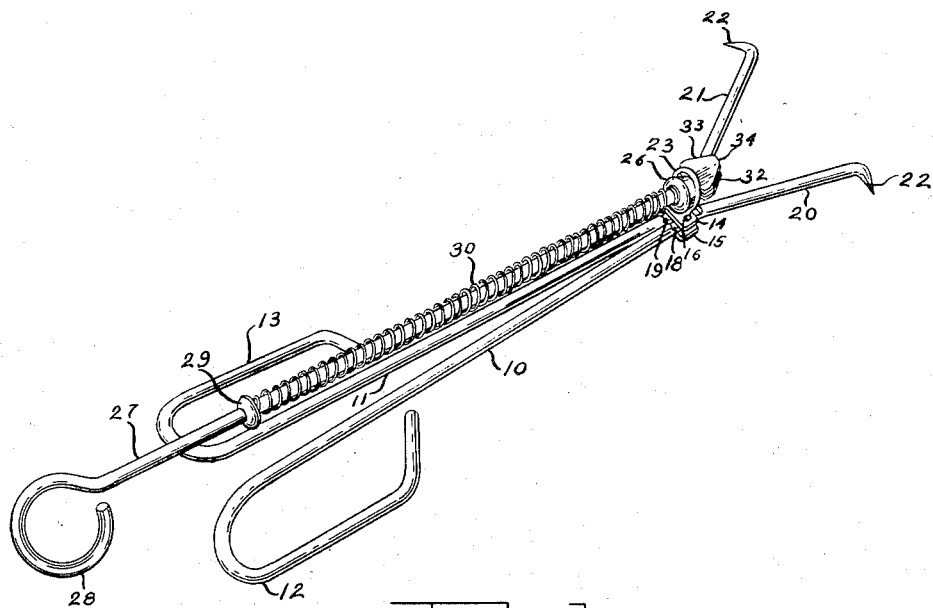
Fig. 1 is a perspective view of one preferred embodiment of the present invention showing the spreader elements in operative position, but with the extractor withdrawn.
Figure 2:
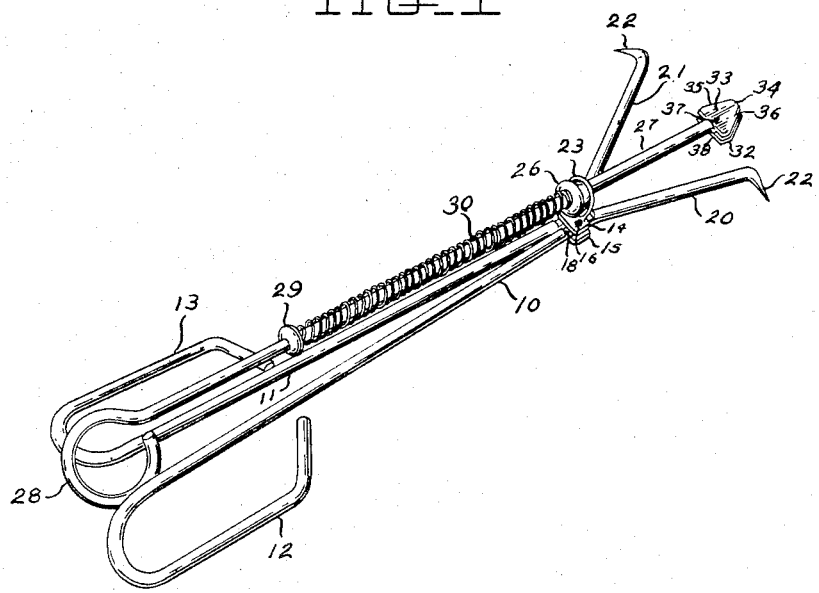
Fig. 2 is a similar view of the same form of the invention with both spreaders and extractor in operative position.

While various aspects of the present inventive concept may be embodied in a wide variety of styles and designs of either jaw spreaders or extractors, as well as in the combination of the instrumentalities, that form of the invention here presented by way of example, may be generally characterized as embodying a pair of elongate pivotally related spreader arms at the outer or manipulating ends of which are preferably looped finger receiving grips, while the opposite inner ends are formed with jaw engaging ends preferably pointed, to pierce and penetrate the fish jaw as they move outward in response to inward movement of the handle ends. Pivotally mounted with the arms, there is provided an extractor bar slidable with respect to the arms. The pivotal and rotatable mounting of the extractor bar permits ease of adjustment and location thereof so as to engage a hook which may be located in either jaw and at either side of the mouth of the fish, as well as regardless of the angularity of the hook. The sliding movement permits the spreaders to act independently of the extractor while forcing the jaws apart and further permits manipulation of the extractor independently of the pivotal relation of the arms.

Referring now in detail to the structure of the device as presented by the accompanying drawings, it will be seen that there is provided a pair of spreader arms having elongate handle ends 10 and 11 terminating in elongate finger and/or thumb receiving loops 12 and 13 respectively. The arms are preferably formed of substantially rigid stock, here shown, as of generally circular cross section. The arms are pivotally united between oppositely disposed spaced parallel upper and lower plates 14 and 15 respectively. Pins 16 and 17 extending between the outer ends of the plates pass through flattened intermediate portions 18 and 19 of the respective arms, thus pivoting the arms in spaced relation.

Outwardly beyond the plates 14 and 15 and as angularly related extensions of the handle ends 10 and 11 are the spreader ends 20 and 21, each provided with an outwardly turned point 22 which may engage by penetration, the inner surfaces of the mouth of a fish. It will, of course, be noted that due to the outward turned angular relation of the spreader ends with respect to the handle ends, the former will lie in closely adjacent substantially parallel closed relation, while the handles are in spaced angular open relation. Conversely, when the handles are closed to lie in substantially parallel relation the spreader ends will separate to lie in the open jaw spreading position. It will be noted, that the points 22 protrude outwardly from the ends 20 and 21 along an axis normal to that of the axis of the spreader ends. Hence, as the spreader ends are opened or spread by the closing of the handle ends, the points move in an arcuate path to engage and penetrate the inner surfaces of the jaws of the fish with a forward movement, as well as a simple spreading direction of travel.

Mounted on the upper plate 14, there is an extractor ring 23 extending in a plane normal to the outer surface of the plate and preferably rigidly secured thereto. Pivotally seated within the ring 23 to form a pivotal bearing on the inner surface thereof is the frusto-conical outer surface of an extractor bearing member 26. The extractor bearing member 26 is formed with a central bore slidably and rotatably mounting the shank 27 of the extractor. At the outer end of the extractor shank 27 there is formed a terminal finger or thumb loop 28. Spaced inwardly from the loop 28, the extractor shank is provided with a fixed stop flange 29 which bears against the outer end of a coil spring 30 encircling the shank 27, the opposite inner end of which bears against the bearing member 26.

From this construction it will be seen that the spring 30 continuously urges the bearing member 26 towards its pivotal seat within the ring 23 and therewith urges the shank outwardly with the loop 28 in fully retracted position as shown in Fig. 1. However, the spring is of insufficient strength to cause the frusto-conical surface to bind within the ring and thus inhibit the free pivotal movement of the member 26 and hence, that of the extractor shank. Furthermore, the strength of the spring 30 is such as to readily yield under finger or thumb manipulation so as to permit sliding movement of the shank through the bearing member. It may further be noted, that in view of the spaced pivotal mounting of the spreader arms independently on the separate pins 16 and 17, some relative longitudinal movement between these arms may take place whereby the plates will vary their angular relation to the normal, here shown. Thus, if desired, such angular variations could be relied upon to provide at least some of the pivotal movement of the extractor shank, even though the bearing member did not pivot with respect to the plate.

The extractor itself comprises a head formed of a pair of spaced parallel plates 32 and 33 of generally triangular formation with flattened apexes 34. Such apexes, as well as the subtended sides 35 and 36 are inwardly beveled to facilitate insertion of the extractor head within the mouth of the fish as well as to form sharp cutting edges applicable to cut on either side of an impaled hook when necessary. The plates 32 and 33 are secured in rigid relation to the outer terminal end of the shank 27 by a transverse pin 37 and/or by welding. The arrangement is such that when the plates are forced inwardly on either side of an impaled hook, the terminal end of the shank between the plates may engage the bite of the hook whereby further inward motion will dislodge the hook. It will be noted, that in extended inoperative position the spring tension will move the shank outwardly so that the outer flat faces 38 of the plates will bear against the inner sides of the plates 16 and 17 or the ring 23, thus acting as a stop for outward movement of the shank under the influence of the spring and acting to secure the shank through the bearing member precluding disassembly of the parts.

Figure 3:
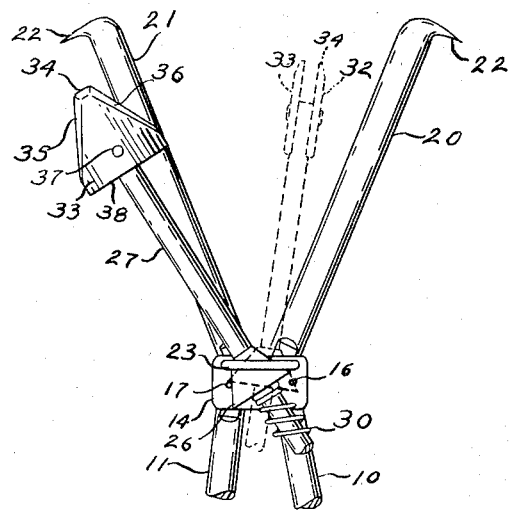
Fig. 3 is a detailed top plan view illustrating the pivotal and rotary adjustments of the extractor.
Figure 4:
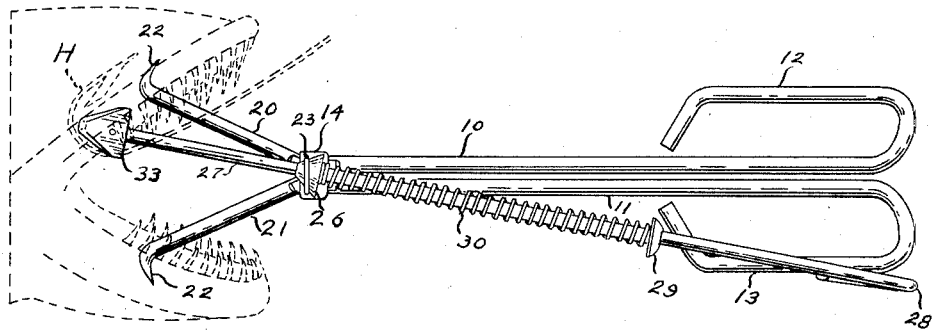
Fig. 4 is a side elevation illustrating the device in use.

In the operation of the device, with the handle ends 10 and 11 separated or open, thus closing the spreader ends 20 and 21 towards parallel position and with the extractor head in withdrawn position, as shown in Fig. 1, the spreader ends 20 and 21 may be readily inserted. After such insertion, the handle ends may be moved towards each other thus separating outwardly the spreader ends. As noted, such outward movement of the ends causes the points 22 to engage the inner opposite surfaces of the jaws to pierce or frictionally preclude slippage as the jaws are spread by the pivotal movement. With the jaws of the fish thus spread and retained in open position by the retention of the handle ends in closed position, the extractor may be moved inwardly between the spreader ends 20 and 21 and against the tension of the spring 30. The hook to be extracted, indicated at H in Fig. 4, may be located in either upper or lower jaw and on either side, as well as inclined. Since, the extractor shank 27 may rock with free universal movement, the extractor may conveniently be moved to either upper or lower jaw and/or to either side of the mouth. Furthermore, since the shank may rotate in the bearing member, it may be turned, as shown by the dotted lines of Fig. 3, to conform with any angularity at which the hook is impaled. By suitable convenient manipulation, the bite of the hook is engaged between the plates 32 and 33 whereupon a further inward thrust will dislodge the hook and, if necessary, the sharpened edges 34, 35 and 36 will cut into the surfaces adjacent the hook to facilitate the engagement thereof between the plates.

From the foregoing, it will be seen that the present invention provides a novel, simple effective and efficient combined mouth spreader and hook extractor. Certain inventive features of each may be applicable independently of the combination. The structure is rugged and durable and well designed to meet the demands of economic manufacture. It will be noted, that in operation, not only is manipulation easy and convenient, but universally applicable, regardless of the location or angularity of hook impalement. In considering the design and construction of that form of the invention herein set forth, it will be understood, that numerous changes, modifications and the full use of equivalents may be resorted to in the practice of the invention without departing from the spirit or scope thereof, as outlined in the appended claims.

What is claimed is:

1. A combination unitary jaw spreader and fishhook extractor comprising spaced substantially parallel plates, a pair of jaw spreading arms pivotally mounted intermediate their length between said plates, said arms terminating at one end in finger engaging portions and at the other in pointed diverging jaw engaging portions, an upstanding ring fixed to said plates, a frusto-conical bearing member received in and engaging said ring for universal angular movement with respect thereto, an axial bore in said bearing member, an elongated extractor shank slidably and rotatably received in said bore, the end of said shank adjacent said jaw engaging portions terminating in a fishhook engaging extractor head comprising spaced parallel generally triangular shaped plates with the side edges sharpened to provide cutting edges, the opposite end of said shank terminating in a finger engaging loop, a collar fixed to said shank in spaced relation to said loop and a compression spring received on said shank between said collar and said bearing member to urge said extractor head toward said ring and hold said bearing member in engagement with said ring.

2. A combination unitary jaw spreader and fishhook extractor comprising a mounting member, a pair of jaw spreading arms pivotally mounted intermediate their length on said member, said arms terminating at one end in finger engaging portions and at the other in pointed diverging jaw engaging portions, an upstanding ring fixed to said member, a frusto-conical bearing member received in and engaging said ring for universal angular movement with respect thereto, an axial bore in said bearing member, an elongated extractor shank slidably and rotatably received in said bore, the end of said shank adjacent said jaw engaging portions terminating in a fishhook engaging extractor head comprising spaced parallel generally triangular plates with the side edges sharpened to provide cutting edges, the opposite end of said shank terminating in a finger engaging loop, a collar fixed to said shank in spaced relation to said loop and a compression spring received on said shank between said collar and said bearing member to urge said extractor head towards said ring and hold said bearing member in engagement with said ring.

3. A combination unitary jaw spreader and fishhook extractor comprising a mounting member, a pair of jaw spreading arms pivotally mounted intermediate their length on said member, said arms terminating at one end in finger engaging portions and at the other in diverging jaw engaging portions, an upstanding ring fixed to said member, a frusto-conical bearing member received in and engaging said ring for universal angular movement with respect thereto, an axial bore in said bearing member, an elongated extractor shank slidably and rotatably received in said bore, the end of said shank adjacent said jaw engaging portions terminating in a fishhook engaging extractor head, the opposite end of said shank terminating in a finger engaging portion, a collar fixed to said shank and a compression spring received on said shank between said collar and said bearing member to urge said extractor head toward said ring and hold said bearing member in engagement with said ring.

References Cited in the file of this patent

UNITED STATES PATENTS

| 253,363 | Foard | Feb. 7, 1882 |
| 1,952,990 | Kirsch | Mar. 27, 1934 |
| 2,481,007 | Dugdale | Sept. 6, 1949 |
| 2,578,289 | Danielson | Dec. 11, 1951 |

FOREIGN PATENTS

| 13,912 | Great Britain | 1898 |